(12) United States Patent
Nagano et al.

(10) Patent No.: US 7,248,554 B2
(45) Date of Patent: Jul. 24, 2007

(54) LASER DRIVING APPARATUS

(75) Inventors: Takashi Nagano, Hamamatsu (JP); Koji Suzuki, Shizuoka-ken (JP); Katsuichi Osakabe, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 422 days.

(21) Appl. No.: 10/108,912

(22) Filed: Mar. 28, 2002

(65) Prior Publication Data

US 2002/0141324 A1 Oct. 3, 2002

(30) Foreign Application Priority Data

Mar. 30, 2001 (JP) .......................... P2001-102651

(51) Int. Cl.
*G11B 7/00* (2006.01)

(52) U.S. Cl. ..................................... 369/59.11; 369/116

(58) Field of Classification Search ............ 369/13.24, 369/13.25, 13.26, 47.51, 47.52, 53.26, 53.27, 369/59.11, 59.12, 116
See application file for complete search history.

(56) References Cited

U.S. PATENT DOCUMENTS

| | | | | |
|---|---|---|---|---|
| 4,796,250 A | * | 1/1989 | Kobayashi et al. | 369/53.26 |
| 4,843,604 A | * | 6/1989 | Fujiwara et al. | 369/116 |
| 5,388,105 A | * | 2/1995 | Takagi et al. | 714/758 |
| 5,396,480 A | * | 3/1995 | Morishita et al. | 369/116 |
| 5,448,551 A | * | 9/1995 | Miyagawa et al. | 369/116 |
| 5,495,464 A | * | 2/1996 | Fujikawa et al. | 369/121 |
| 5,590,096 A | * | 12/1996 | Ohtsuka et al. | 369/13.18 |
| 5,991,251 A | * | 11/1999 | Sakurai et al. | 369/53.2 |
| 6,246,659 B1 | * | 6/2001 | Suzuki et al. | 369/116 |
| 6,269,060 B1 | * | 7/2001 | Harvey et al. | 369/59.1 |
| 6,400,673 B1 | * | 6/2002 | Shigemori | 369/116 |
| 6,683,836 B2 | * | 1/2004 | Miyagawa et al. | 369/116 |
| 6,738,339 B2 | * | 5/2004 | Gyo | 369/116 |
| 6,754,156 B2 | * | 6/2004 | Akabane | 369/53.26 |
| 2002/0021641 A1 | * | 2/2002 | Miyabata et al. | 369/116 |
| 2005/0185546 A1 | * | 8/2005 | Watabe | 369/47.51 |

FOREIGN PATENT DOCUMENTS

| | | |
|---|---|---|
| JP | 07-240026 | 9/1995 |
| JP | 7240026 | * 9/1995 |
| JP | 11-265509 | 9/1999 |

OTHER PUBLICATIONS

Electronic Translation of JP 7-240 026.*
Patent Abstract of Japan Yoshida Tomio JP 63-113824 May 1998.*
YOSHIKAWA, Office Action, Japanese Patent Office (Japan), pp. all, (Nov. 2, 2004).

* cited by examiner

*Primary Examiner*—Wayne Young
*Assistant Examiner*—Van T. Pham
(74) *Attorney, Agent, or Firm*—Pillsbury Winthrop Shaw Pittman LLP (57) ABSTRACT

A strategy process used for recording data on an optical disk is also used during DC erase is performed. Effects similar to those obtained in the case, in which a high frequency signal is superposed on a laser diode output current during the DC erase, can be obtained by performing the strategy process on the laser diode output current during the DC erase. This eliminates the necessity for generating high-level and high-frequency signals. Consequently, an apparatus can be constructed at low cost.

7 Claims, 8 Drawing Sheets

FIG. 3A
UNIT A
PRIOR ART

FIG. 3B
UNIT B
PRIOR ART

FIG. 3C
UNIT C
PRIOR ART

FIG. 5A Smode

FIG. 5B DUMMY EFM1

FIG. 5C DUMMY EFM2

FIG. 5D RECORDING CURRENT

FIG. 5E ERASE CURRENT

FIG. 5F LD OUTPUT CURRENT

FIG. 8A  Smode

FIG. 8B  RECORDING EFM

FIG. 8C  DUMMY EFM

FIG. 8D  RECORDING CURRENT

FIG. 8E  ERASE CURRENT

FIG. 8F  LD OUTPUT CURRENT

LASER DRIVING APPARATUS

BACKGROUND OF THE INVENTION

The present invention relates to a laser driving apparatus suitable for use in an optical disk apparatus.

An optical disk apparatus for reading/writing a rewritable optical disk (such as a CD-RW and a DVD-RAM) needs to change a laser power level among three levels. These levels, from lowest level to highest level, are called a "read level", a "erase level", and a "write level", respectively. The read level is used for reading an optical disk. The erase level is used for erasing information therefrom. The write level is used for writing information thereon. More particularly, laser power at the erase level causes the transition of the state of a surface of an optical disk to a pit non-formed state. Laser power at the write level causes the transition of the state of a surface of an optical disk to a pit formed state.

Figure 1:
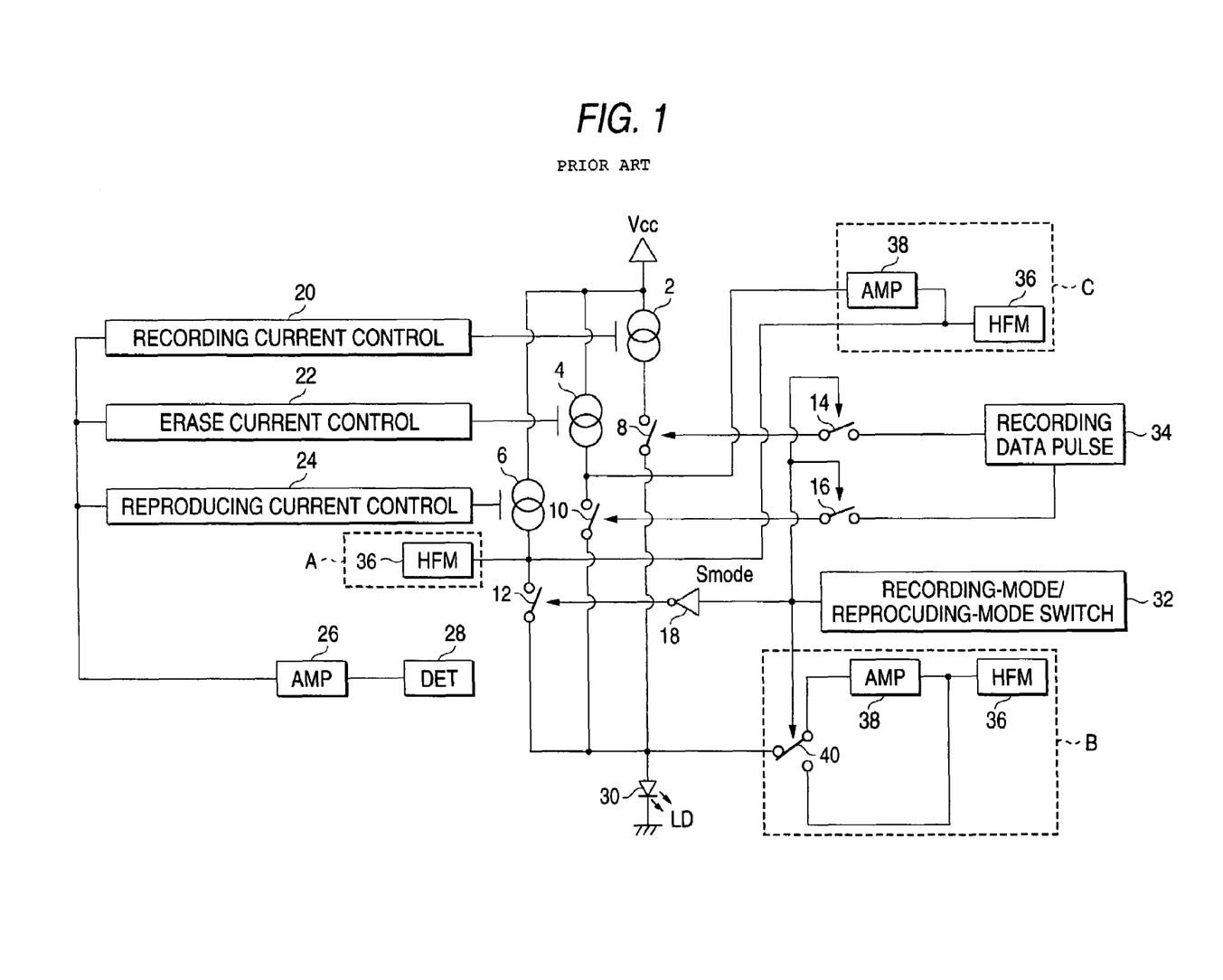
FIG. 1 is a block view illustrating a related laser power control circuit.

FIG. 1 shows an example of a laser power control circuit for controlling laser power in such a manner.

In the figure, reference numeral 2 designates a write level current source, reference numeral 4 denotes an erase level current source, and reference numeral 6 denotes a read level current source. The current sources 2, 4, and 6 respectively supply an electric current capable of generating laser power at the write level, an electric current capable of generating laser power at the erase level, and an electric current capable of generating laser power at the read level to a laser diode 30 through switches 8, 10, and 12. Reference numeral 28 denotes a photo detector for monitoring the laser power of the laser diode 30. Reference numeral 26 denotes an amplifier for amplifying a result of this monitoring.

Reference numeral 20 denotes a recording current control portion, reference numeral 22 denotes an erase current control portion, and reference numeral 24 denotes a reproducing current control portion. Each of the control portions 20, 22, and 24 performs a feedback control operation on a corresponding one of the current sources 2, 4, and 6 so that a corresponding generated laser power level comes close to a corresponding one of the predetermined levels. Reference numeral 34 denotes a recording data pulse generating portion that outputs pulse signals for turning on and off the switches 8 and 10 through switches 14 and 16. Reference numeral 32 denotes a recording-mode/reproducing-mode switch portion that outputs a mode switching signal Smode according to an operation mode of the optical disk apparatus. This mode switching signal Smode represents "1" when the operation mode becomes a recording mode, and represents "0" when the operation mode becomes a reproducing mode.

The on/off control of the switch 12 is performed according to the mode switching signal Smode inverted through the inverter 18. In the reproducing mode, the switch 12 is set to an on-state. In the recording mode, the switch 12 is set to an off-state. The on/off control of the switches 14 and 16 is performed according to the mode switching signal Smode. In the reproducing mode, the switches 14 and 16 are set to an off-state. In the recording mode, the switches 14 and 16 are set to an on-state. Therefore, in the recording mode, the recording data pulse generating portion 34 is enabled to perform the on/off control of the switches 8 and 10 through the switches 14 and 16.

Next, the waveform of a laser diode output current obtained according to the aforementioned configuration is described with reference to FIGS. 2A to 2F. At a moment t1 shown in FIG. 2A, the mode switching signal Smode rises from "0" to "1". That is, the operation mode is changed from the reproducing mode to the recording mode. Incidentally, the "recording mode" is further classified into a "data recording mode", in which readable data is recorded on an optical disk, and a "DC erase mode", in which the already recorded data is simply erased.

Figure 2A:
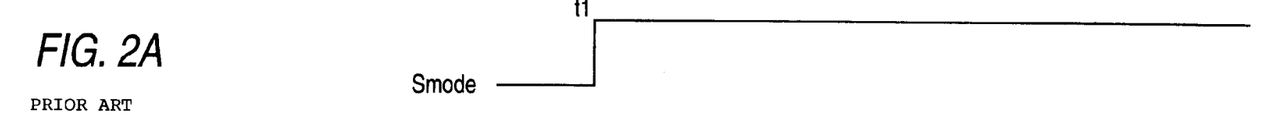
FIGS. 2A to 2F are waveform views respectively illustrating the waveforms of signals flowing through parts of FIG. 1.
Figure 2B:
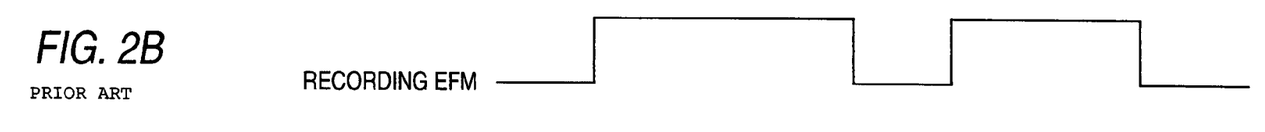
Figure 2C:
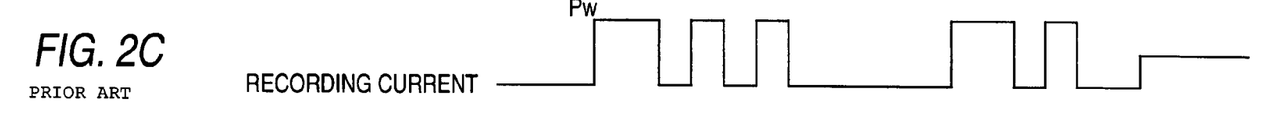
Figure 2D:
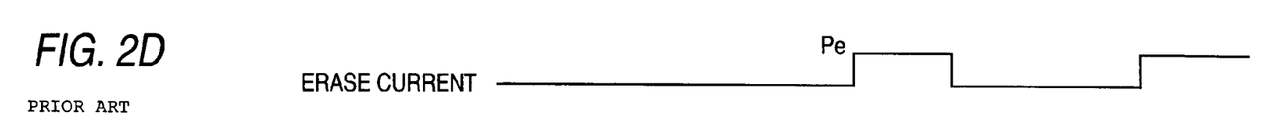
Figure 2E:
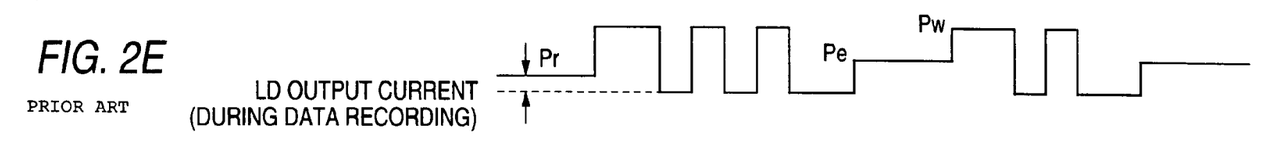

In the data recording mode, a recording EFM signal generated as shown in FIG. 2B is supplied to the recording data pulse generating portion 34 from a control circuit (not shown). In the recording data pulse generating portion 34, the switching control of the switches 8 and 10 is performed so that a recording current and an erase current respectively shown in FIGS. 2C and 2D are outputted correspondingly to the recording EFM signal through the switches 8 and 10. Incidentally, the recording current corresponds mainly to the level "1" of the recording EFM signal, while the erase current corresponds mainly to the level "0" of the recording EFM signal. The generated recording current and the generated erase current are super imposed. Then, a resultant signal is supplied to the laser diode 30 as a laser diode output current shown in FIG. 2E.

Figure 2F:
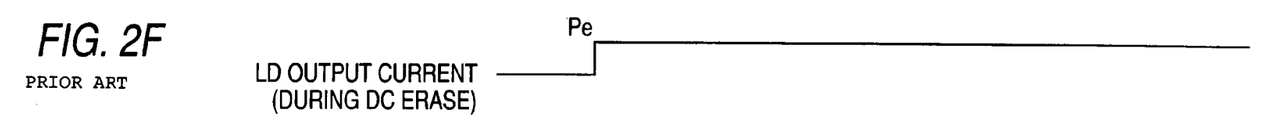

Incidentally, the recording current is modulated by using the write level Pw as a peak value so that the waveform thereof has a pectinate shape. This prevents a pit from being deformed like a teardrop owing to a heat accumulation effect. The formation of the waveform of a recording current in this manner is called "a strategy process". The strategy process enables the formation of various waveforms, such as a waveform, in which the width of a leading pulse is set to be wider than that of a subsequent pulse, another waveform whose duty ratio is changed, and another waveform whose rising timing and falling timing are changed. Meanwhile, in the DC erase mode, no recording current is outputted. Further, only an erase current is continuously outputted. Consequently, the laser diode output current is continuously at the erase level Pe, as shown in FIG. 2F.

Meanwhile, it is frequent that a high frequency signal is superimposed on an output current to the laser diode 30. This is to reduce an optical feedback noise and to accurately detect a wobble signal. Various kinds of manners of high-frequency superposition are illustrated in dashed line regions A, B, and C in FIG. 1. First, in the dashed line region A, reference numeral 36 denotes a high-frequency oscillator that is connected to an output terminal of the read level current source 6 and that superposes a high-frequency signal on a read level current.

Another manner of performing high-frequency superposition is illustrated in the dashed line region B. In the figure, reference numeral 40 denotes a switch that selects one of a high-frequency signal outputted from the high-frequency oscillator 36, and another high-frequency signal obtained by amplifying the high-frequency signal outputted from the oscillator 36 through an amplifier 38, according to the mode switching signal Smode and that superposes the selected signal on a laser output current. A switch 40 is switched according to an operation mode. That is, during the recording mode, a contact provided at the side of the amplifier 38 is selected. During the reproducing mode, a contact provided at the side of the high-frequency oscillator 36 is selected. In the case of this manner of performing high-frequency superposition, during the recordingmode, a high-frequency signal is superposed on both the currents that are at the erase level and the write level.

Another manner of performing high-frequency superposition is illustrated in the dashed line region C. This manner similar to the manner illustrated in the dashed line region A in that a high-frequency signal outputted from the high-frequency oscillator 36 shown in the figure is superposed onto the read level current. However, this high-frequency signal is amplified through an amplifier 38. Then, the amplified high-frequency signal is superposed on an erase level current.

Figure 3A:
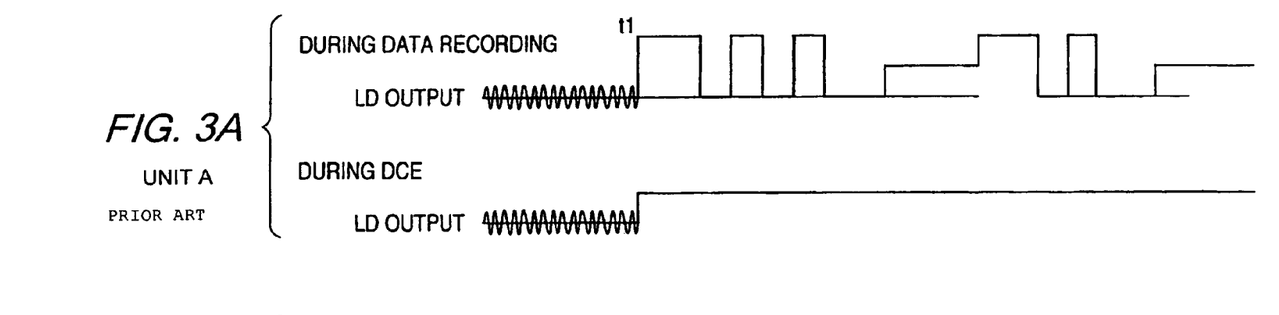
FIGS. 3A to 3C are waveform views respectively illustrating the waveforms of signals flowing through the respective units A, B and C of FIG. 1 in the case that high-frequency superposition is applied thereto.
Figure 3B:
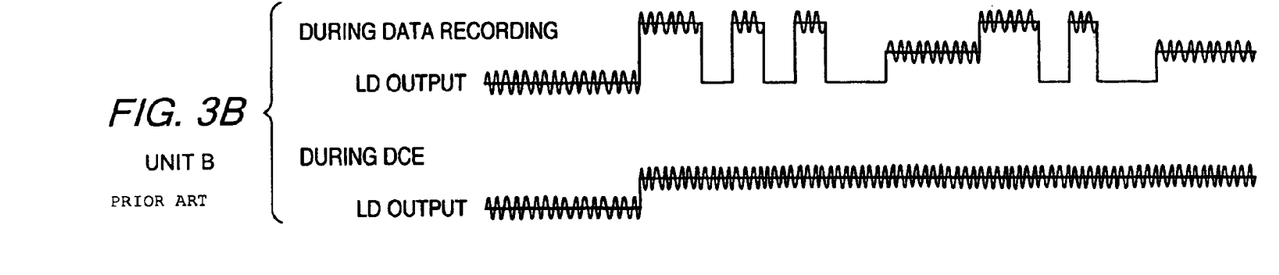
Figure 3C:
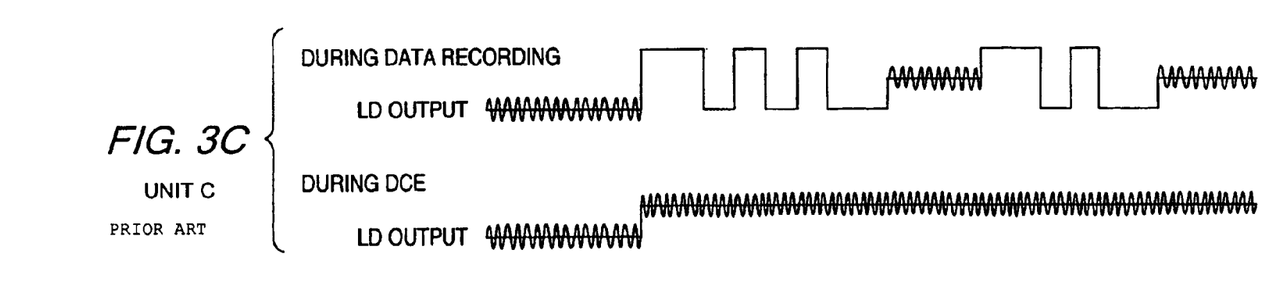

Hereunder, the techniques of performing high-frequency superposition by utilizing the manners respectively illustrated in the dashed line regions A, B, and C are referred to as "unit A, unit B, and unit C". Incidentally, the reason for superposing the amplified high-frequency signal on the erase level current or the write level current in the unit B and the unit C is that the erase level and the write level are considerably high, as compared with the read level, and that thus, a sufficient effect cannot be obtained unless the signal level of the high-frequency signal is raised according to the erase or write level. FIGS. 3A to 3C illustrate laser diode output currents, on each of which a high-frequency signal is superposed, to be respectively provided during the data recording and during the DC erase according to the unit A, the unit B, and the unit C.

However, according to the unit A, high-frequency superposition is performed only in the recording mode. Thus, as illustrated in FIG. 3A, the high-frequency superposition is not performed at all during the DC erase. Therefore, during the DC erase, there are caused drawbacks that the optical feedback noise increases, that the quality of the wobble signal is degraded, and that thus a spindle control operation is not accurately performed. Such drawbacks are eliminated by the unit B and the unit C, according to each of which high-frequency superposition is performed even during the erase. However, there is the need for amplifying the high-frequency signal. Consequently, it is necessary to provide the amplifier 38 in the circuit. This results in increase in the number of components of the circuit and in the manufacturing cost thereof. Furthermore, in the case of the unit B according to which the high-frequency superposition is performed on the write level current, a high-frequency signal is superposed on a current that is at a top power level. Thus, the circuit should use a high-rating (expensive) laser diode so as to prevent the laser diode 30 from being broken. Consequently, the unit B has a drawback in that the use of the high-rating laser diode results in further increase in the cost of the circuit.

SUMMARY OF THE INVENTION

The invention is accomplished in the aforementioned circumstances. Accordingly, an object of the invention is to provide a laser driving apparatus enabled to sufficiently suppress optical feedback noises at low cost.

In order to solve the aforesaid object, the invention is characterized by having the following arrangement.

(1) A laser driving apparatus for use in an optical disk drive for performing recording, rewriting or continuous erase of data by irradiating an optical recording medium with laser light outputted from a laser light source, the laser driving apparatus comprising:
a current supplying unit which supplies a high level current, on which a strategy process is performed, to the laser light source when performing recording or rewriting of the information and supplies a low level current, on which a strategy process is performed, to the laser light source when performing continuous erase of the information (2) The laser driving apparatus according to (1), wherein the strategy process applied to the low-level current is to intermittently put the low-level current into an on-state, and wherein a length of a time period, in which the low-level current is set to an off-state, is a length that is sufficient to detect a synchronization signal from the optical recording medium to be able to obtain a quality level equal to or higher than a limit value, at which the optical recording medium can be stably driven, and to prevent an unerased part from remaining therein.

(3) The laser driving apparatus according to (2), wherein the length of the time period, in which the low-level current is set to be in an off-state, is determined in the strategy process.

(4) The laser driving apparatus according to (2) further comprising a delay circuit, wherein the length of the time period, in which the low-level current is set to be in an off-state, is determined by a delay time of the delay circuit.

(5) A laser driving apparatus for use in an optical disk drive for performing recording, rewriting or continuous erase of information by irradiating an optical recording medium with laser light outputted from a laser light source, the laser driving apparatus comprising:
a current supplying unit which intermittently supplies a high level current, on which a strategy process is performed, to the laser light source when performing recording or rewriting of the information, and supplies a low level current, on which a strategy process is performed, to the laser light source in a time period during which the high level current is not supplied to the laser light source.

(6) A method of continuously erasing data by irradiating a rewritable optical recording medium with laser light outputted from a laser light source, the method comprising the steps of:
generating a signal;
performing a strategy process on the signal to obtain an erase current control signal;
generating a erase current based on the erase current control signal; and
supplying the erase current to the laser light source.

DETAILED DESCRIPTION OF PREFERRED EMBODIMENTS

1. Configuration of Embodiment

Next, the configuration of a laser power control circuit according to an embodiment of the invention is described with reference to FIG. 4. Incidentally, in FIG. 4, same reference characters denote parts corresponding to those of FIG. 1. The description of such parts is omitted herein.

Figure 4:
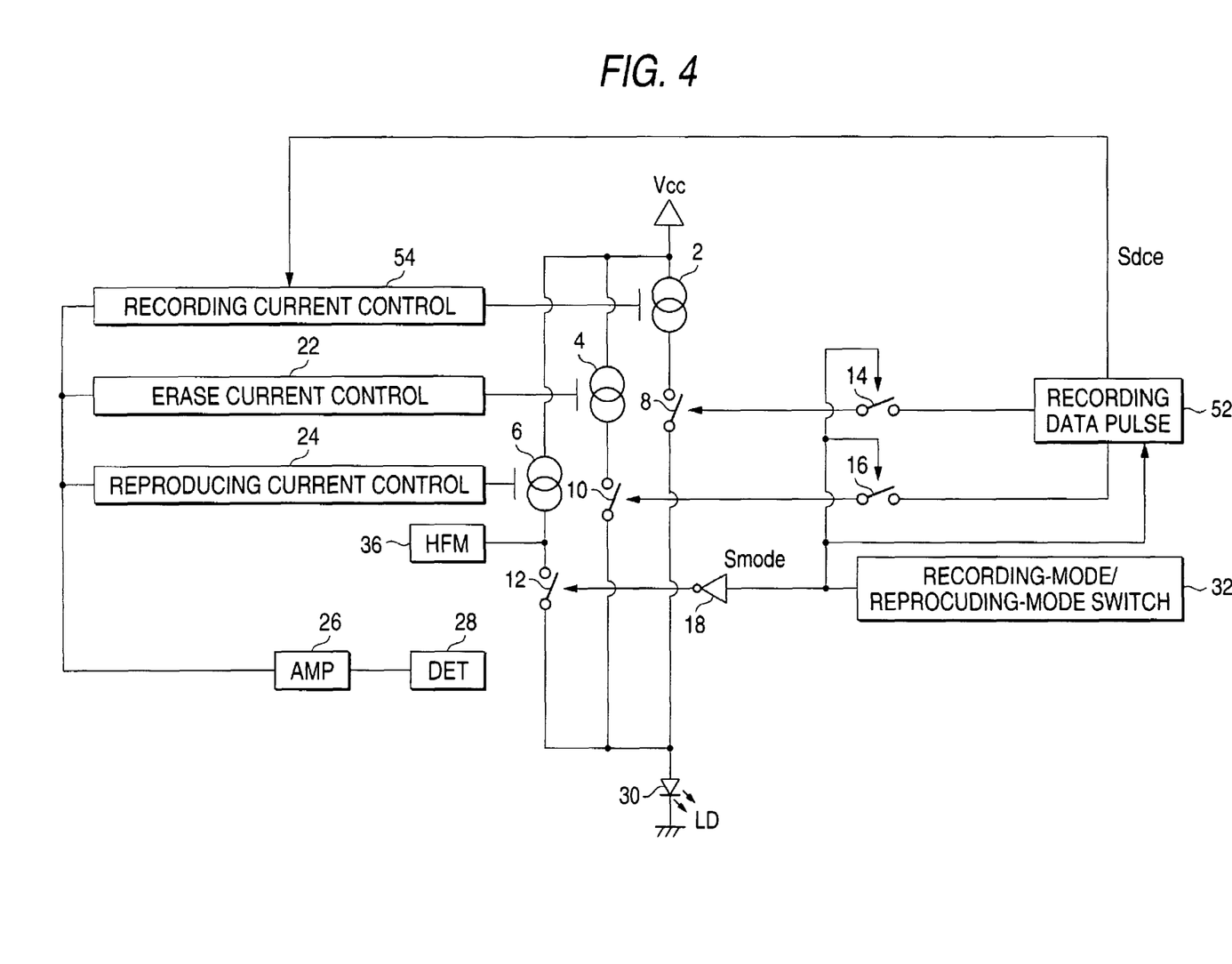
FIG. 4 is a block view illustrating a laser power control circuit that is an embodiment of the invention.

As shown in FIG. 4, a high-frequency oscillator 36 is connected to an output terminal of a read level current source 6. Therefore, similarly as in the circuit according to the related art employing the unit A as shown in FIG. 1, a high-frequency signal is superposed on a read level current. A recording current control portion 54 and a recording data pulse generating portion 52 instead of the recording current control portion 20 and the recording data pulse generating portion 34 in the related art are provided therein, respectively.

A construction of the recording current control portion 54 is similar to the construction of the recording current control portion 20 in the related art. However, the control portion 54 differs from the portion 20 in that when the control portion 54 receives a signal Sdce indicating that the operation mode is the DC erase mode, the peak value of the output current of the write level current source 2 is set at the erase level Pe, and that otherwise, the peak value thereof is set at the write level Pw. In each of the reproducing mode and the data recording mode, the recording data pulse generating portion 52 operates, similarly as the recording data pulse generating portion 34 in the related art does. Therefore, in this embodiment, the laser diode output current in the reproducing mode has a waveform shaped before a moment t1 illustrated in an upper chart in FIG. 3A, and the laser diode output current in the data recording mode has a waveform shaped after the moment t1 illustrated in an upper chart in FIG. 3A.

Figure 5A:
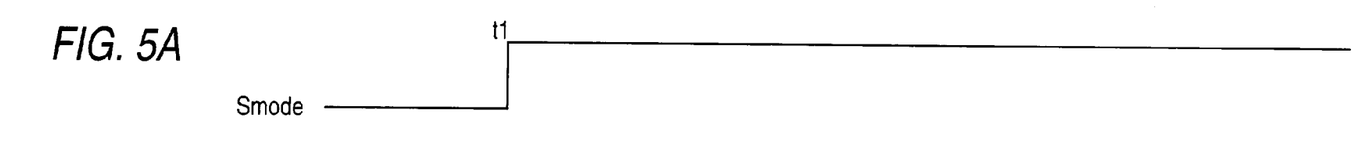
FIGS. 5A to 5F are waveform views respectively illustrating the waveforms of signals flowing through parts of FIG. 4 in a DC erase mode.
Figure 5B:
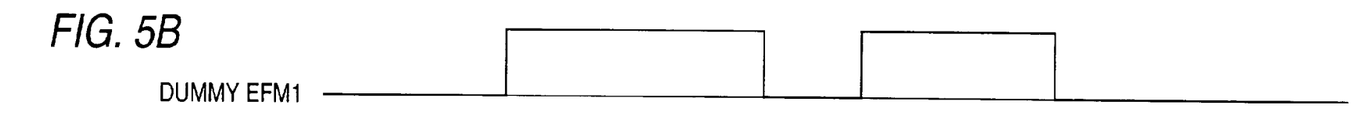
Figure 5C:
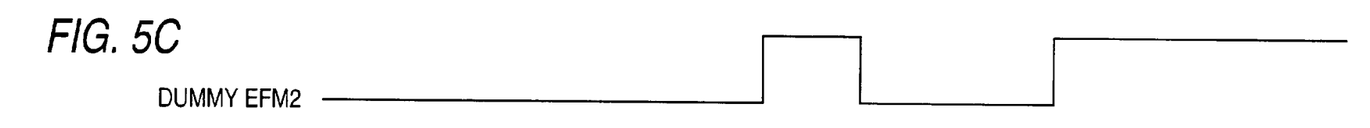

On the other hand, when the operation mode is the DC erase mode, the signal Sdce is supplied from the recording data pulse generating portion 52 to the recording current control portion 54, and a mode switch signal Smode shown in FIG. 5A is supplied from the recording-mode/reproducing-mode switch portion 32 to the recording data pulse generating portion 52. Moreover, a dummy EFM signal 1 shown in FIG. 5B is supplied from a control circuit (not shown) to the recording data pulse generating portion 52. In the recording data pulse generating portion 52, a dummy EFM signal 2 shown in FIG. 5C is generated by obtaining an exclusive-OR between the mode switch signal Smode and the dummy EFM signal 1.

Figure 5D:
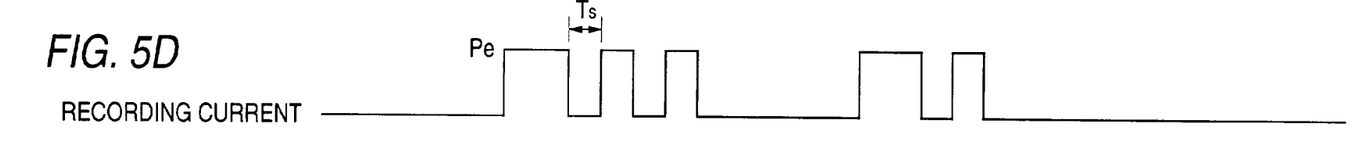
Figure 5E:
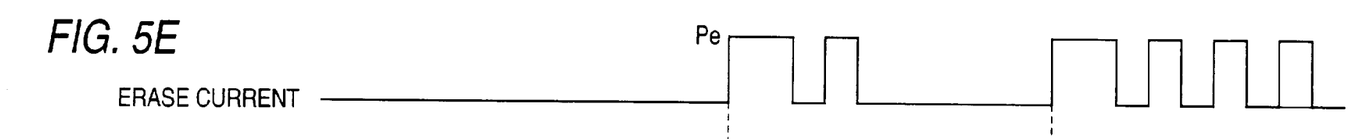
Figure 5F:
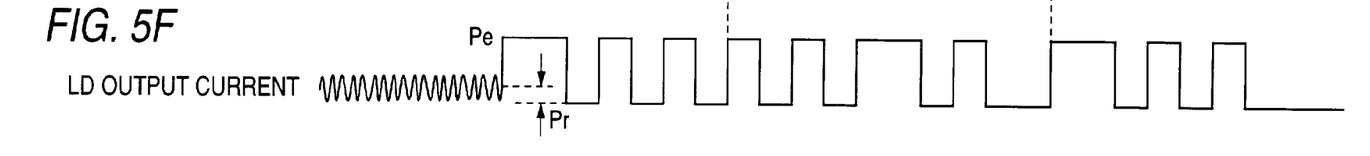

Subsequently, a recording current control signal is generated by performing the strategy process on the dummy EFM signal 1. An erase current control signal is generated by performing the strategy process on the dummy EFM signal 2. Incidentally, the waveform of each of the recording current control signal and the erase current control signal is similar to that of a corresponding one of the recording current and the erase current respectively shown in FIGS. 5D and 5E. A peak value thereof does not correspond to the erase level Pe but corresponds to the level "1" of a logical signal. When the on/off control of the switches 8 and 10 is performed in response to the recording current control signal and the erase current control signal, the recording current and the erase current which employ the erase level Pe as the peak value are actually outputted through the switches 8 and 10. Consequently, a laser diode output current synthesized from the read level current, the recording current and the erase current as shown in FIG. 5F is supplied to the laser diode 30.

Incidentally, in this embodiment, the current outputted from the write level current source 2 through the switch 8 is called "the recording current", for the sake of convenience. However, in the DC erase mode, the peak value of the recording current is suppressed to the erase level Pe. Therefore, no pits are formed on a surface of an optical disk according to the recording current. According to this embodiment, even when the DC erase is performed, the strategy process is performed on the laser diode output current. Thus, similarly as in the case that the high-frequency superposition is performed, the optical feedback noises of the laser diode 30 can be reduced. Meanwhile, in this embodiment, during the DC erase is performed, the laser diode output current is intermittently outputted therefrom. Hence, there is possibility that an "unerased part" may remain therein, and that moreover, the intermittent output of the laser diode output current may deteriorate the quality of the wobble signal.

It is determined according to the length of the off-period Ts (see FIG. 5D), in which the recording current is put into an off-state in the strategy process, whether or not the quality of the wobble signal is ensured, and whether or not the unerased part is restrained from remaining therein. That is, the longer the off-period becomes, it is more likely that an unerased part remains therein. The shorter the off-period becomes, it is more likely to deteriorate the quality of the wobble signal.

Figure 6A:
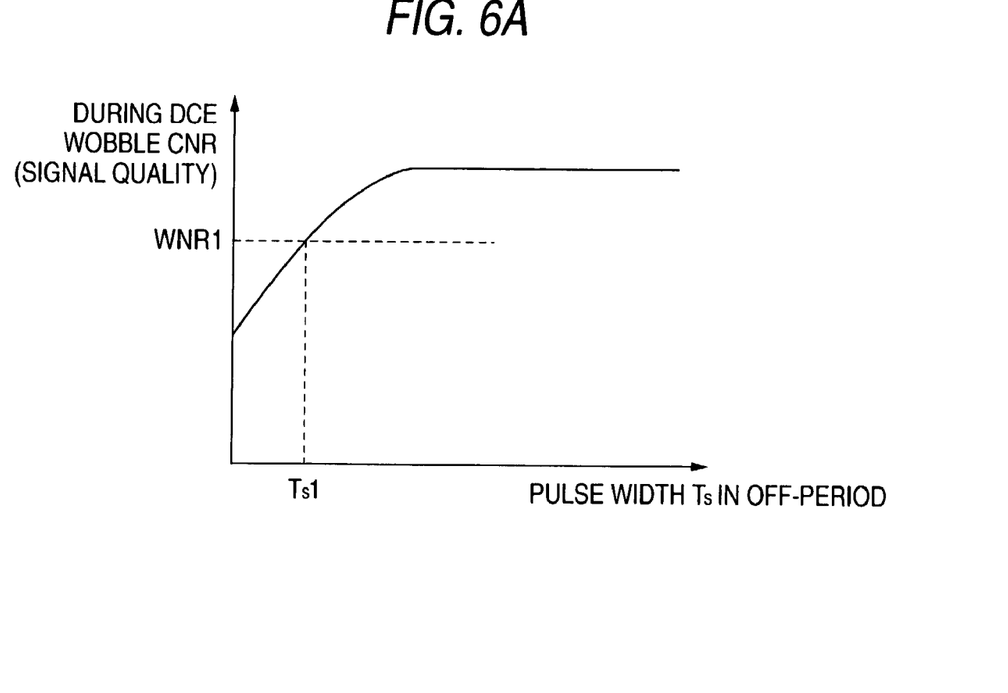
FIGS. 6A and 6B are views illustrating the principle of determining the length of an off-period Ts.
Figure 6B:
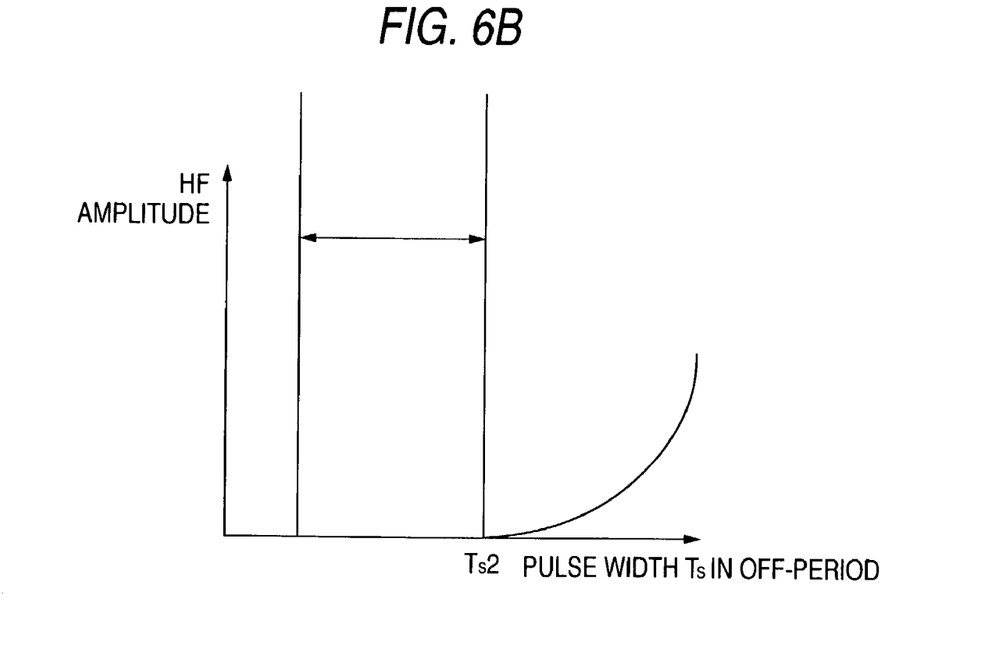

Such manners are described hereinbelow with reference to FIGS. 6A and 6B. FIG. 6A illustrates a CNR (a carrier/noise ratio) of a wobble signal corresponding to the length of the off-period Ts. When the CNR is higher than a predetermined threshold value shown in this figure, the spindle control operation is stably performed. The length Ts of the off-period, at which this threshold value WNR1 is obtained, is a limit of servo stability Ts1. FIG. 6B illustrates a HF amplitude corresponding to the length of the off-period Ts. The HF amplitude is a signal amplitude, which is read from a surface of the disk. When the optical disk is in a completely erased state, the value of the HF amplitude ought to be "0". However, as illustrated in FIG. 6B, when the length of the off-period Ts is equal to or longer than Ts2, the HF amplitude rises from "0". This value Ts2 is called "an erase limit".

It is necessary to preliminary measure the limit of servo stability Ts1 and the erase limit Ts2, and to set the length of the off-period Ts in the strategy process to be in a range that meets the following inequality: $Ts1 \leq Ts \leq Ts2$. Incidentally, the limit of servo stability Ts1 and the erase limit Ts2 vary with a recording rate (such as a single speed and a double speed). Therefore, in this embodiment, the length of the off-period Ts is determined correspondingly to each recording rate in such a way as to satisfy the condition $Ts1 \leq Ts \leq Ts2$ correspondingly to each recording rate.

Hereinafter, an example of the configuration of a circuit for providing the length Ts of the off-period is described by referring to FIG. 7A. In this figure, reference numeral 60 designates a write strategy circuit adapted to output binary signals respectively corresponding to an on-state and an off-state of the recording current, that is, strategy signals $S_{st1}$. Incidentally, the duty ratio of the strategy signal $S_{st1}$, is 50%. Reference numerals 72, ..., 72 denote a plurality of (more particularly, an even number of) inverters, which are series-connected. The strategy signal $S_{st1}$ is supplied to a leading one of these inverters. Similarly, each of groups of inverters 74, ..., and 74, and inverters 76, ..., 76 has series-connected inverters and is supplied with the strategy signal $S_{st1}$.

Reference numeral 66 designates a selector that selects a signal sent from one of series circuits according to a speed command signal (corresponding to, for instance, a single speed, and a double speed) supplied from a CPU 68. Reference numeral 62 designates an OR-circuit that outputs a signal representing a logical-OR of the strategy signal selected in the selector 66 and the strategy signal $S_{st1}$ as a modified strategy signal $S_{st2}$. The strategy signal $S_{st1}$ supplied to one of the series circuits each consisting of the inverters is delayed by a time equal to a total of delay times of these inverters, and supplied to the selector 66.

Therefore, a value represented by the modified strategy signal $S_{st2}$ is equal to a logical-OR of the undelayed strategy signal $S_{st1}$, and the delayed strategy signal $S_{st1}$. The fall of the modified strategy signal $S_{st2}$ is delayed by a delay time of the series circuit consisting of the inverters behind the fall of the strategy signal $S_{st1}$. Thus, when the on/off control of the switch 8 is performed according to the modified strategy signal $S_{st2}$, the length Ts of the off-period is reduced by a time that is equal to the delay time of the series circuit consisting of the inverters. As described above, the length Ts of the off-period varies with the recording rate. Thus, the series circuit corresponding to the rate is selected in the selector 66 so as to obtain a necessary delay time.

2. Examples of Modification

The invention is not limited to the aforementioned embodiment. For example, various modifications can be made as follows.

Figure 7A:
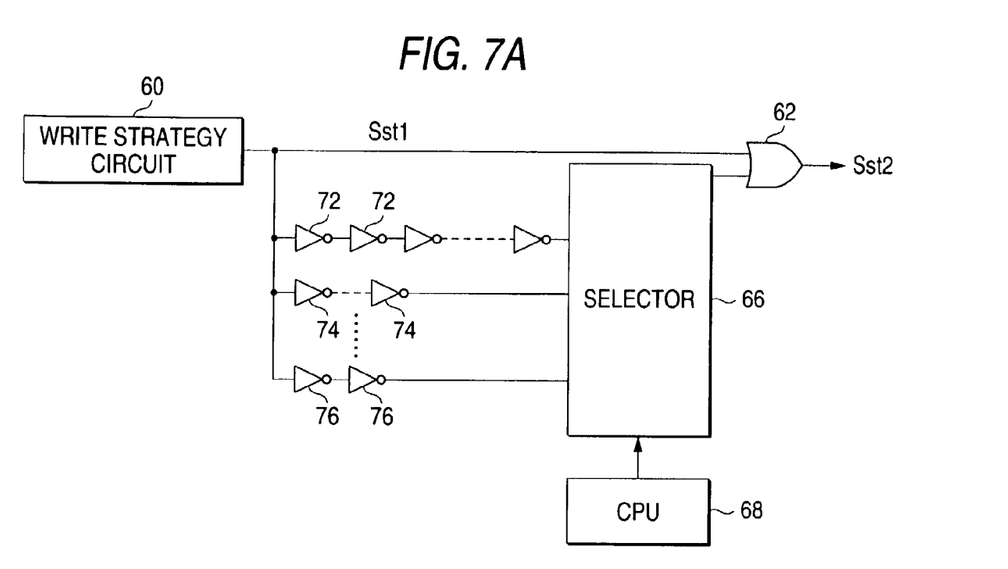
FIGS. 7A to 7C are block views respectively illustrating a primary portion of the recording data pulse generating portion 34 and modifications thereof.
Figure 7B:
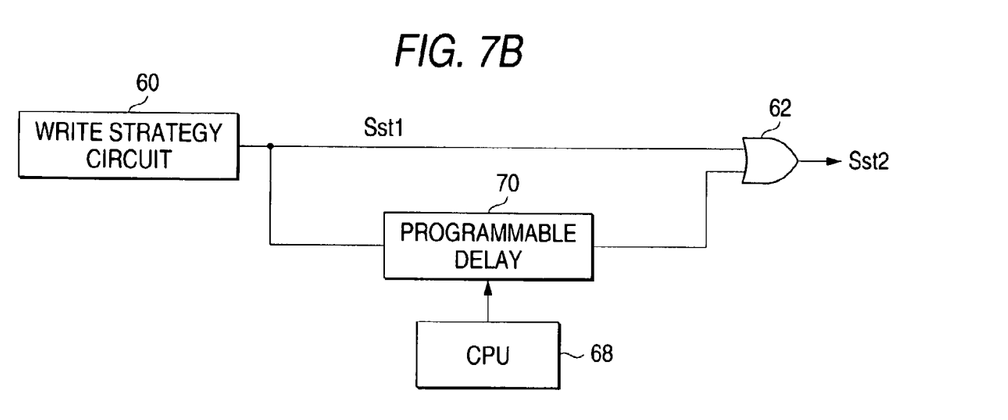

(1) The circuit shown in FIG. 7A maybe modified as illustrated in FIG. 7B. The circuit shown in FIG. 7B has a programmable delay circuit 70, instead of the series circuits of the inverters and the selector 66. The delay time of this programmable delay circuit 70 is set by the CPU 68 according to the recording rate. Consequently, the length of the off-period Ts is set at a value corresponding to the recording rate.

Figure 7C:
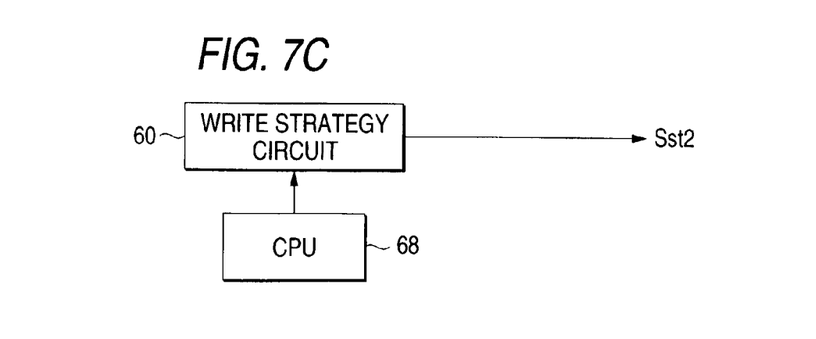

(2) The write strategy circuit 60 may be configured so that the duty ratio of the strategy signal is freely set according to an external parameter. In such a case, the modified strategy signal $S_{st2}$ corresponding to the recording rate can be outputted by giving the parameter from the CPU 68 to the write strategy circuit 60, as illustrated in FIG. 7C.

Figure 8A:
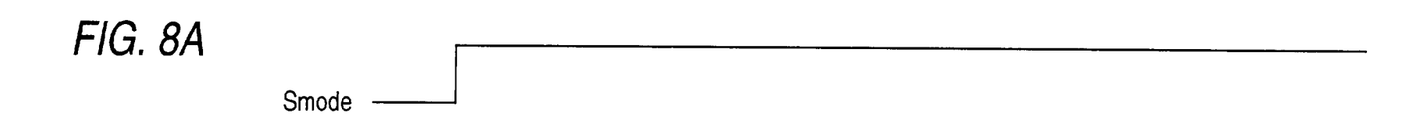
FIGS. 8A to 8F are waveform views respectively illustrating the waveforms of signals flowing through parts of the modification of the embodiment in the data recording mode.
Figure 8B:
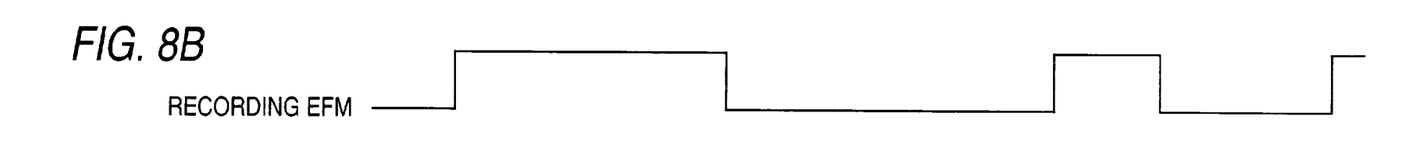
Figure 8C:
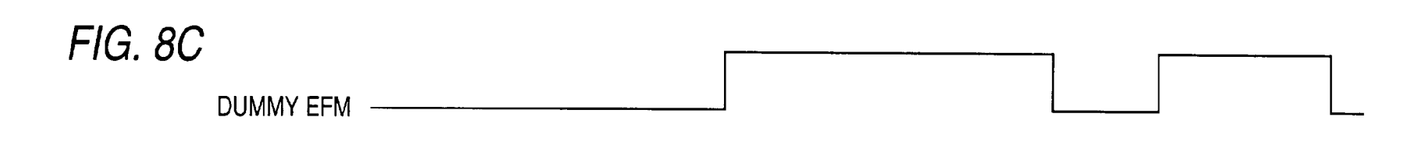

(3) Although the strategy process is performed on the erase current in the DC erase mode in the aforementioned embodiment, a similar process may be performed in the data recording mode. An example of this process is described hereinbelow with reference to FIGS. 8A to 8F. As illustrated in waveform views, a dummy EFM signal of FIG. 8C is generated in the recording data pulse generating portion 52 by using an exclusive-OR between a mode switching signal Smode of FIG. 8A and a recording EFM signal of FIG. 8B. Then, a recording current control signal is generated by performing the strategy process on the recording EFM signal of FIG. 8B. An erase current control signal is generated by performing the strategy process on a dummy EFM signal of FIG. 8C. Incidentally, the waveforms of the recording current control signal and the erase current control signal are similar to that of the recording current shown in FIG. 8D and that of the erase current shown in FIG. 8E, respectively. The peak value is neither the write level nor the erase level, but the level "1" of a logical signal.

Figure 8D:
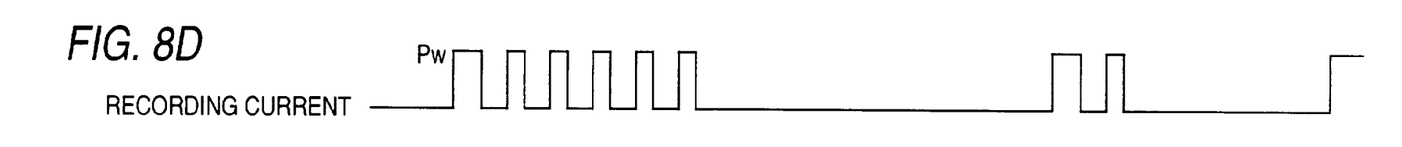
Figure 8E:
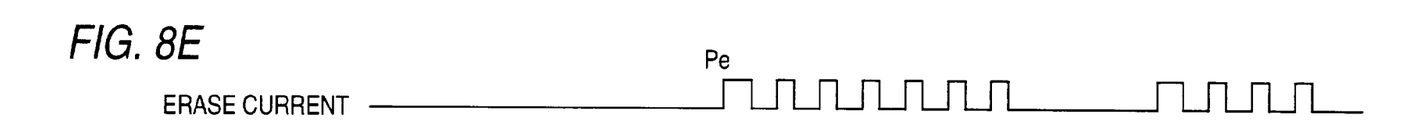
Figure 8F:
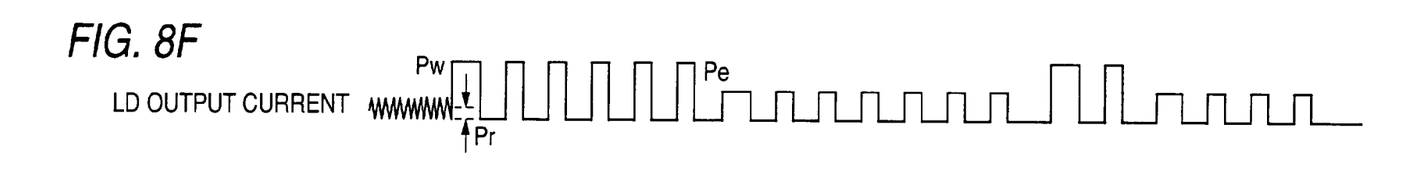

Then, when the on/off control of each of the switches 8 and 10 is performed in response to a corresponding one of the recording current control signal and the erase current control signal, the recording current of FIG. 8D and the erase current of FIG. 8E, which actually employ the write level Pw and the erase level Pe as the peak values, respectively, are outputted through the switches 8 and 10. Consequently, a laser diode output current illustrated in FIG. 8F and synthesized from the read level current, the recording current, and the erase current is supplied to the laser diode 30. In the case of this modification, there is no need for performing high-frequency superposition on the erase current. Thus, similarly as the aforementioned embodiment, this modification has an advantage in that high-level and high-frequency signals are unnecessary.

As described above, according to the invention, when the continuous erase of information is performed, the low level current, on which the strategy process is performed, is supplied to the laser light source. Thus, the strategy process originally needed at the time of recording information can also be used for the continuous erase of information. This eliminates the necessity for generating high-level and high-frequency signals. Consequently, an apparatus can be constructed at low cost. Moreover, optical feedback noises can be sufficiently suppressed.

What is claimed is:

1. A laser driving apparatus for irradiating an optical recording medium with laser light outputted from a laser light source, the laser driving apparatus comprising:
   a photo detector for monitoring a laser power of the laser light source and generating a signal representative of the laser power; and
   a current supplying unit, to receive the signal representative of the laser power, which supplies a write level current, on which a strategy process is performed, the strategy process modulating the write level current into a waveform having a pectinate shape, to the laser light source when performing recording or rewriting of the data and which supplies an erase level current, on which the strategy process is performed, the strategy process modulating the erase level current into a waveform having a pectinate shape, to the laser light source when performing continuous erase of previously recorded data, wherein the erase level current is generated using a dummy EFM signal.

2. The laser driving apparatus according to claim 1, wherein the strategy process applied to the erase level current is to intermittently put the erase level current into an on-state, and wherein a length of a time period, in which the erase level current is set to an off-state, is a length that is sufficient to detect a synchronization signal from the optical recording medium to obtain a quality level equal to or higher than a limit value, at which the optical recording medium is stably driven, and to prevent an unerased part from remaining therein.

3. The laser driving apparatus according to claim 2, wherein the length of the time period, in which the erase level current is set to be in an off-state, is determined in the strategy process.

4. The laser driving apparatus according to claim 2 further comprising a delay circuit, wherein the length of the time period, in which the erase level current is set to be in an off-state, is determined by a delay time of the delay circuit.

5. A laser driving apparatus for irradiating an optical recording medium with laser light outputted from a laser light source, the laser driving apparatus comprising:
   a photo detector for monitoring a laser power of the laser light source and generating a signal representative of the laser power;
   a current supplying unit, to receive the signal representative of the laser power, which supplies a write level current, on which a strategy process is performed, the strategy process modulating the write level current into a waveform having a pectinate shape, to the laser light source when performing recording or rewriting of the data, and which supplies an erase level current, on which the strategy process is performed, the strategy process modulating the erase level current into a waveform having a pectinate shape, to the laser light source in a time period during which the write level current is not supplied to the laser light source, wherein the erase level current is generated using a dummy EFM signal.

6. A method of continuously erasing data by irradiating a rewritable optical recording medium with laser light outputted from a laser light source, the method comprising:
generating a first signal and a second signal, the second signal being the first signal inverted;
performing a strategy process on the first and second signals to obtain an erase current control signal by adding the processed first and second signals, the strategy process modulating the first and second signals to form a waveform having a pectinate shape;
generating an erase current using a dummy EFM signal, based on the erase current control signal; and
supplying the erase current to the laser light source.

7. A laser driving apparatus for performing recording, rewriting or continuous erase of data by irradiating an optical recording medium with laser light outputted from a laser light source, the laser driving apparatus comprising:
a first current source for outputting a current having a write level and a current having an erase level lower than the write level;
a second current source for outputting a current having an erase level; and a current supply unit, wherein in a case of performing recording or rewriting, the current supply unit performs a strategy processing on the current having the write level output from the first current source to provide a first processed current and supplies the first processed current to the laser light source when an EFM signal for recording has a first value and supplies the current having erase level output from the second current source to the laser light source when the EFM signal for recording has a second value, and in a case of performing continuous erase, the current supplying unit receives a dummy EFM signal, and performs the strategy processing on the current having erase level output from the first current source to provide a second processed current and supplies the second processed current to the laser light source when the dummy EFM signal has the first value, and performs the strategy processing on the current having erase level output from the second current source to generate a third processed current and supplies the third processed current to the laser light source when the dummy EFM signal has the second value.

* * * * *